United States Patent
Komolrochanaporn

(10) Patent No.: US 6,824,172 B1
(45) Date of Patent: Nov. 30, 2004

(54) PUSH-PULL PIPE COUPLING

(76) Inventor: Naris Komolrochanaporn, 119 Soi Watsuthavas, Bukkalo Dhonoburi, Bangkok (TH), 10600

( * ) Notice: Subject to any disclaimer, the term of this patent is extended or adjusted under 35 U.S.C. 154(b) by 0 days.

(21) Appl. No.: 10/685,360

(22) Filed: Oct. 14, 2003

(51) Int. Cl.[7] ............................ F16L 39/00; F16L 37/00
(52) U.S. Cl. ........................................ 285/340; 285/105
(58) Field of Search ............................ 285/307, 340, 285/105, 342

(56) References Cited

U.S. PATENT DOCUMENTS

| | | | | |
|---|---|---|---|---|
| 2,201,372 A | * | 5/1940 | Miller | 285/105 |
| 2,448,888 A | * | 9/1948 | Hynes | 285/232 |
| 2,999,701 A | * | 9/1961 | Blair et al. | 285/340 |
| 3,018,785 A | * | 1/1962 | Adams, Jr. et al. | 277/624 |
| 3,434,744 A | * | 3/1969 | Paterson et al. | 285/52 |
| 3,445,120 A | * | 5/1969 | Barr | 277/625 |
| 3,874,709 A |   | 4/1975 | MacDonald | |
| 3,877,733 A | * | 4/1975 | Straub | 285/105 |
| 4,146,254 A |   | 3/1979 | Turner et al. | |
| 4,230,349 A |   | 10/1980 | Normark | |
| 4,440,424 A |   | 4/1984 | Mode | |
| 4,593,943 A | * | 6/1986 | Hama et al. | 285/308 |
| 4,630,848 A | * | 12/1986 | Twist et al. | 285/308 |
| 4,637,636 A | * | 1/1987 | Guest | 285/38 |
| 4,722,558 A |   | 2/1988 | Badoureaux | |
| 4,747,626 A |   | 5/1988 | Hama et al. | |
| 4,848,805 A | * | 7/1989 | Bucher et al. | 285/105 |
| 4,895,395 A | * | 1/1990 | Ceriani | 285/39 |
| 4,919,457 A |   | 4/1990 | Moretti | |
| 5,029,908 A |   | 7/1991 | Belisaire | |
| 5,085,472 A | * | 2/1992 | Guest | 285/139.2 |
| 5,094,467 A | * | 3/1992 | Lagabe | 277/616 |
| 5,096,235 A | * | 3/1992 | Oetiker | 285/308 |
| 5,160,179 A |   | 11/1992 | Takagi | |
| 5,193,856 A |   | 3/1993 | Suzuki | |
| 5,205,568 A |   | 4/1993 | Stoll et al. | |
| 5,464,228 A | * | 11/1995 | Weber et al. | 277/615 |
| 5,487,572 A |   | 1/1996 | Combot-Courrau et al. | |
| 5,580,100 A |   | 12/1996 | Umezawa et al. | |
| 5,681,058 A |   | 10/1997 | Hwang | |
| 5,695,224 A |   | 12/1997 | Grenier | |
| 5,799,985 A | * | 9/1998 | Murphy | 285/38 |
| 5,911,443 A |   | 6/1999 | Le Quere | |
| 5,957,509 A |   | 9/1999 | Komolrochanaporn | |
| 6,224,114 B1 |   | 5/2001 | Franzen et al. | |
| 6,264,250 B1 | * | 7/2001 | Teraoka et al. | 285/340 |
| 6,312,019 B1 | * | 11/2001 | Nakazumi et al. | 285/39 |
| 6,367,802 B1 |   | 4/2002 | Knapp | |
| 6,378,915 B1 |   | 4/2002 | Katz | |
| 6,488,318 B1 |   | 12/2002 | Shim | |

FOREIGN PATENT DOCUMENTS

| | | | |
|---|---|---|---|
| EP | 0592823 | * | 9/1993 |
| JP | 52-46518 | * | 4/1977 |
| JP | 52-46519 | * | 4/1977 |
| WO | WO92/02753 | * | 2/1992 |

* cited by examiner

Primary Examiner—Eric K. Nicholson
(74) Attorney, Agent, or Firm—Jack C. Munro

(57) ABSTRACT

A pipe coupler for joining a pair of pipe sections in a fluid tight manner. A hollow connector has an internal chamber within which is to be located a pipe section. Surrounding the pipe section and mounted in conjunction with the connector is a coupler. The coupler includes a grab ring housing. Formed within the grab ring housing is an annular concavity. Mounted within this concavity is a grab ring which includes a plurality of pivotable biting members which are arranged to dig in the wall surface of the pipe section when the pipe section is longitudinally moved a limited withdrawing distance from the connector.

5 Claims, 4 Drawing Sheets

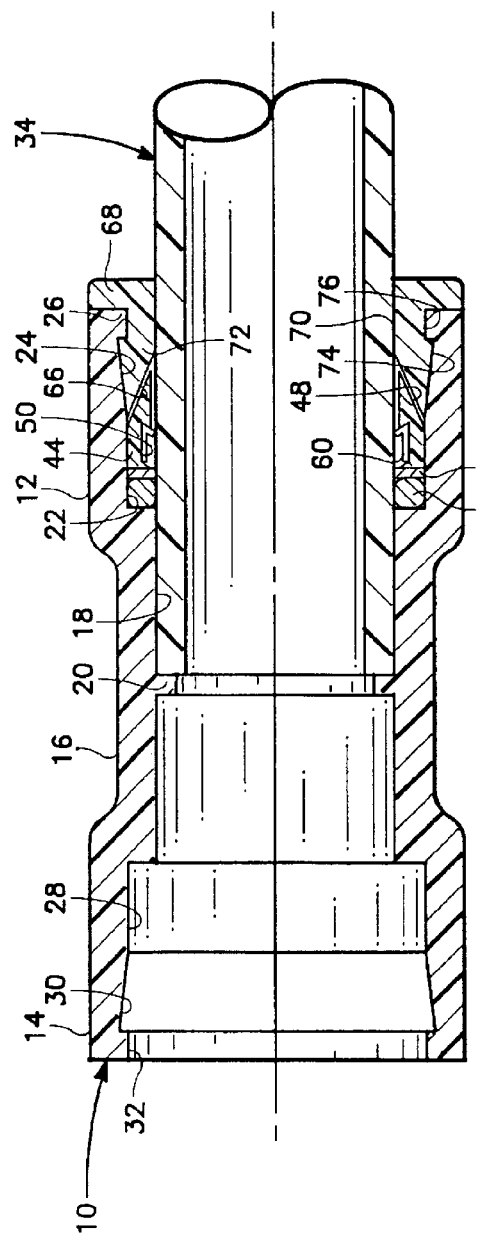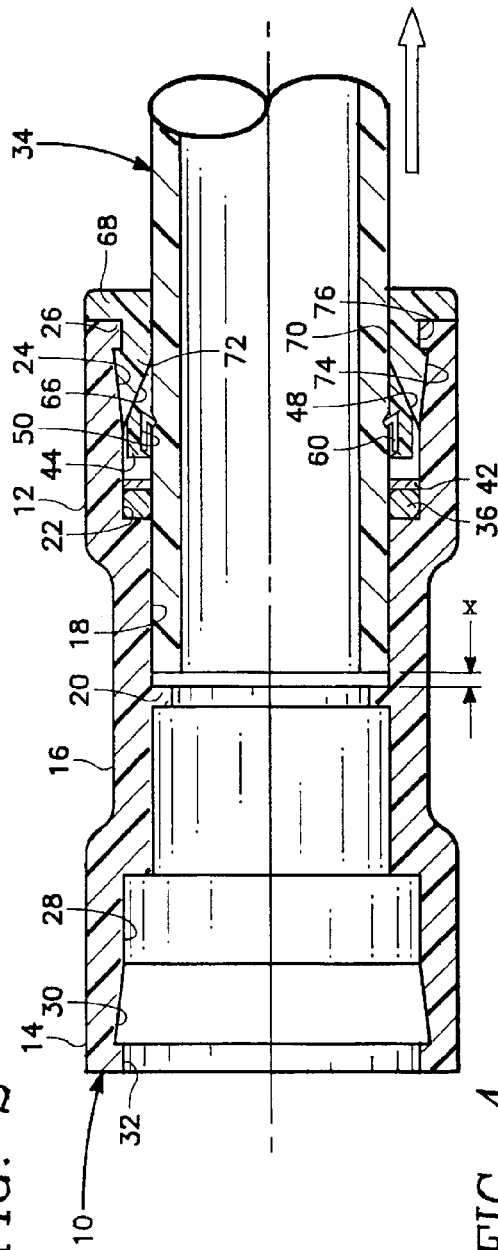

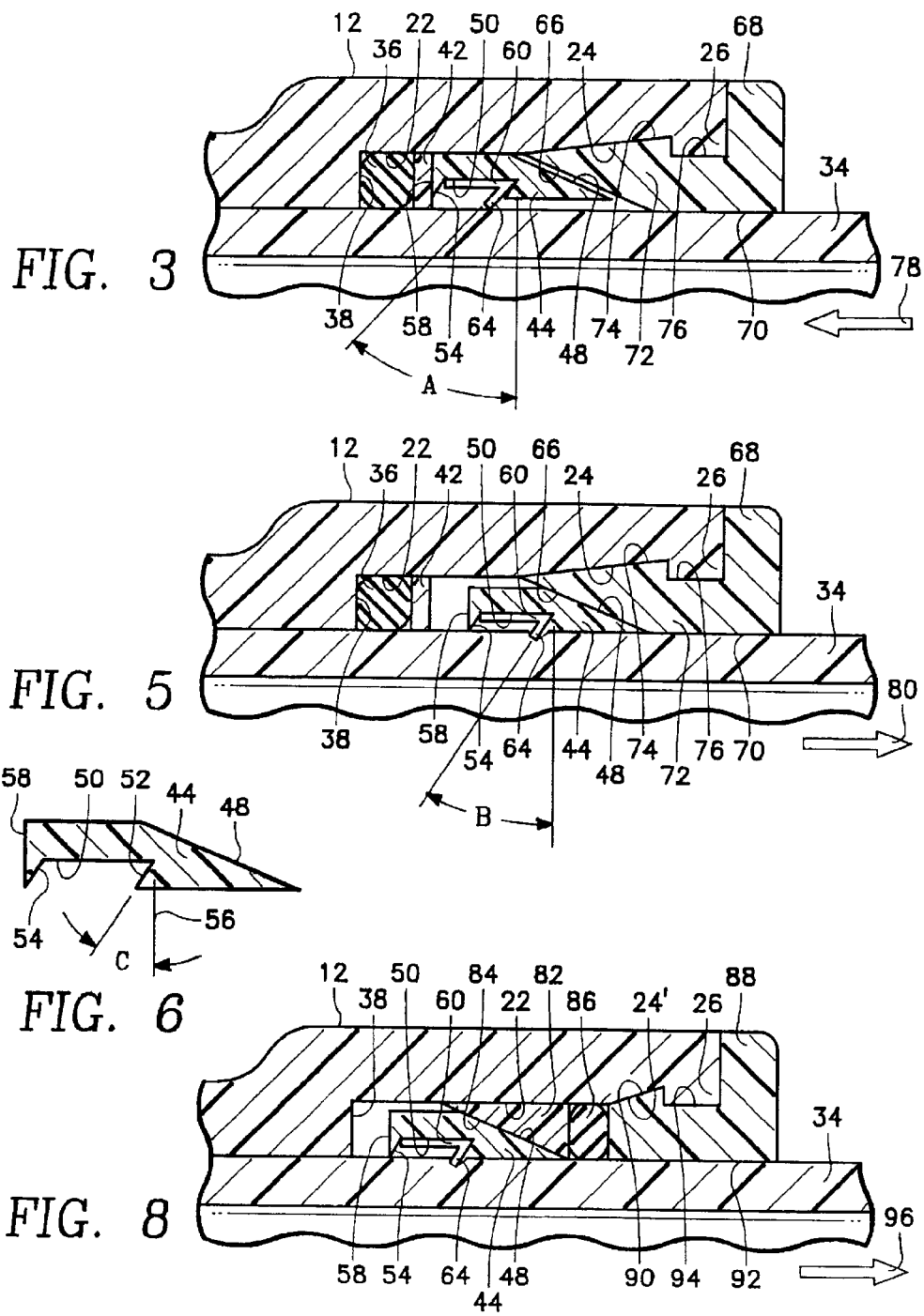

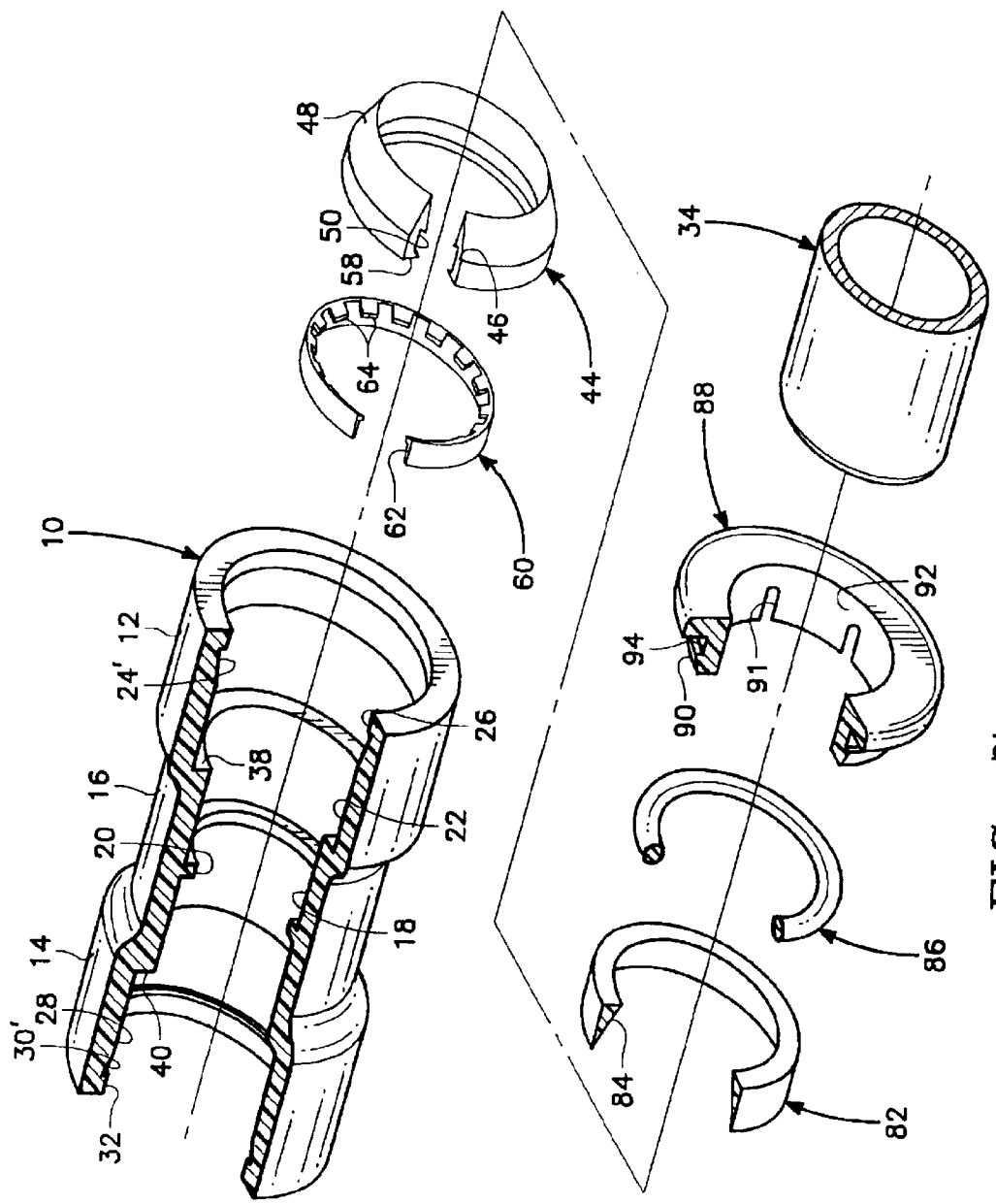

PUSH-PULL PIPE COUPLING

BACKGROUND OF THE INVENTION

1. Field of the Invention

The field of this invention relates to pipes and more particularly to a coupling for two pipe sections which are to be connected together in a fluid tight manner without requiring welding, soldering or other conventional types of permanent securing techniques.

2. Description of the Related Art

Plastic pipe has long been used for the conveying of fluid, such as liquids and gases. Any plastic pipe system will inherently include a series of connectors with these connectors being utilized to connect together aligned pipe sections of the overall pipe system. It is intended that these connectors must provide a fluid tight seal over a range of temperatures, pressures and a variety of exterior ambient conditions. Specifically for plastic pipe, a reliable connector is indeed rare owing to the stress to which the connectors are subjected due to environmental changes, pressure changes and temperature changes. These changes cause fatigue in the connectors which inherently result in leakage of gas or liquid from the connector.

One prior art of pipe coupling that is currently available is defined as a compression system. This type of coupling is large in size when compared to the plastic pipe which makes it difficult to install in limited space areas. Additionally, tools are needed to make the installation required for this compression system. Also, an extensive installation area is required to the large size of the compression system coupling making it virtually impossible to install such compression system couplings within restricted space areas like concrete walls.

Additionally, in the past, prior art pipe couplings were easily removed which led to the plundering of the fluid that is being conducted through the pipe sections. It would be desirable to design a pipe coupling that required special tools in order to remove the coupling thereby minimizing the possibility of unauthorized removal of any gas or liquid being conducted through the pipe system.

In the past, there have been manufactured pipe couplings where a pipe section is inserted into a connector and then moved in a withdrawing manner so that biting members dig into and grip the wall surface of the pipe section which results in the pipe section not detaching from the connector with a fluid tight connection being established between the connector and the pipe section. Within the prior art, it is common to construct the biting members of a hard plastic material. However, the hard plastic biting members are commonly ineffective when used in conjunction with solid PVC pipe or metallic pipe. Also, over time, the quality of the grip of the connector on the pipe section will deteriorate due to the fluctuation of the temperature of the fluids being conducted through the pipe section. In the past, if the biting members are constructed to be metallic, such have to be of substantial thickness in order to work satisfactorily. This increased thickness of the biting members causes inconvenience in the radial compression while at the same time a substantial amount of force is required to compress the grab ring that supports the biting members in order to penetrate the surface of the pipe section. Hence, these prior art difficulties frequently cause fatigue and deformation of the plastic exerting the compressive force.

SUMMARY OF THE INVENTION

One of the primary objectives of the present invention is to construct a plastic pipe coupling that is used for joining pipe sections in a liquid tight manner over a range of different pressures and temperatures.

Another objective of the present invention is to construct a plastic pipe coupling that can be easily installed without requiring any tools or special skills by the installer.

Another objective of the present invention is to construct a plastic pipe coupling that is compact in size making it easy to install in areas of limited space, such as when the pipe system is imbedded within a wall.

Another objective of the present invention is to construct a plastic pipe coupling that can be manufactured at a lower cost than other configurations of pipe coupling and therefore to be able to be sold to the ultimate consumer at a relatively inexpensive price.

The basic embodiment of the present invention is directed to a push-pull pipe coupling adapted for connecting a pair of pipe sections. A hollow connector has an internal chamber within which is adapted to be located a pipe section. Surrounding the pipe section is a coupler with this coupler including a grab ring housing which is annular in configuration and is located about the pipe section. The grab ring housing has an interior surface that is formed into an annular concavity. The coupler includes a grab ring mounted within this concavity with the grab ring having an annular wall which has a plurality of inwardly extending biting members. These biting members are adapted to abut against the pipe section. The biting members permit the pipe section to be moved relative to the connector in an installing direction, and when completely installed and a withdrawing movement applied to the pipe section, the biting members are caused to pivot and dig into the pipe section forming a solid securement between the connector and the pipe section.

A further embodiment of the present invention is where the basic embodiment is modified by the grab ring being defined as a split ring.

A further embodiment of the present invention is where the basic embodiment is modified by the annular concavity being defined as having a forward wall which is located at an acute angle which is less than the acute angle of the biting members prior to the withdrawing movement of the pipe section.

A further embodiment of the present invention is where the basic embodiment is modified by the annular concavity having a rear wall.

A further embodiment of the present invention is where the basic embodiment is modified by the grab ring housing being constructed of a hard plastic material.

A further embodiment of the present invention is where the basic embodiment is modified by the grab ring being constructed of a metallic material.

A further embodiment of the present invention is where the basic embodiment is modified by the grab ring housing having an annular front beveled surface.

A further embodiment of the present invention is where the just previous embodiment is modified by there being formed a second annular beveled surface on a retaining cap with the annular beveled surface of the grab ring housing to be in sliding contact with the annular beveled surface of the retaining cap.

A further embodiment of the present invention is where the just previous basic embodiment is modified by a washer having an annular beveled surface which is in engagement with the annular beveled surface on the grab ring housing.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 2 is a longitudinal cross-sectional view through the first embodiment of push-pull pipe coupling of the present invention showing the coupling with a pipe section inserted the maximum distance within the connector of the pipe coupling where the biting members of the grab ring are not imbedded within the wall surface of the pipe section;

FIG. 3 is an enlarged view of the coupler utilized in conjunction within the pipe coupling of the present invention with the biting members of the grab ring in the position of FIG. 2;

FIG. 4 is a longitudinal cross-sectional view similar to FIG. 2 but where the pipe section is shown withdrawn a limited distance from the coupling which resulted in the biting members of the grab ring being pivoted and are caused to imbed within the wall surface of the pipe section;

FIG. 5 is an enlarged cross-sectional view of just the coupler utilized in conjunction with the pipe coupling of the present invention with the coupler being in the position of FIG. 4;

FIG. 6 is a longitudinal cross-sectional view through the grab ring housing that is utilized in conjunction with the coupler of the pipe coupling of the present invention;

FIG. 7 is a longitudinal, cut-away, exploded isometric view of a second embodiment of pipe coupling of the present invention; and FIG. 8 is a longitudinal cross-sectional view showing the coupler of the second embodiment of the present invention in the imbedded position relative to the pipe section with which it is installed.

DETAILED DESCRIPTION OF THE INVENTION

Figure 1:
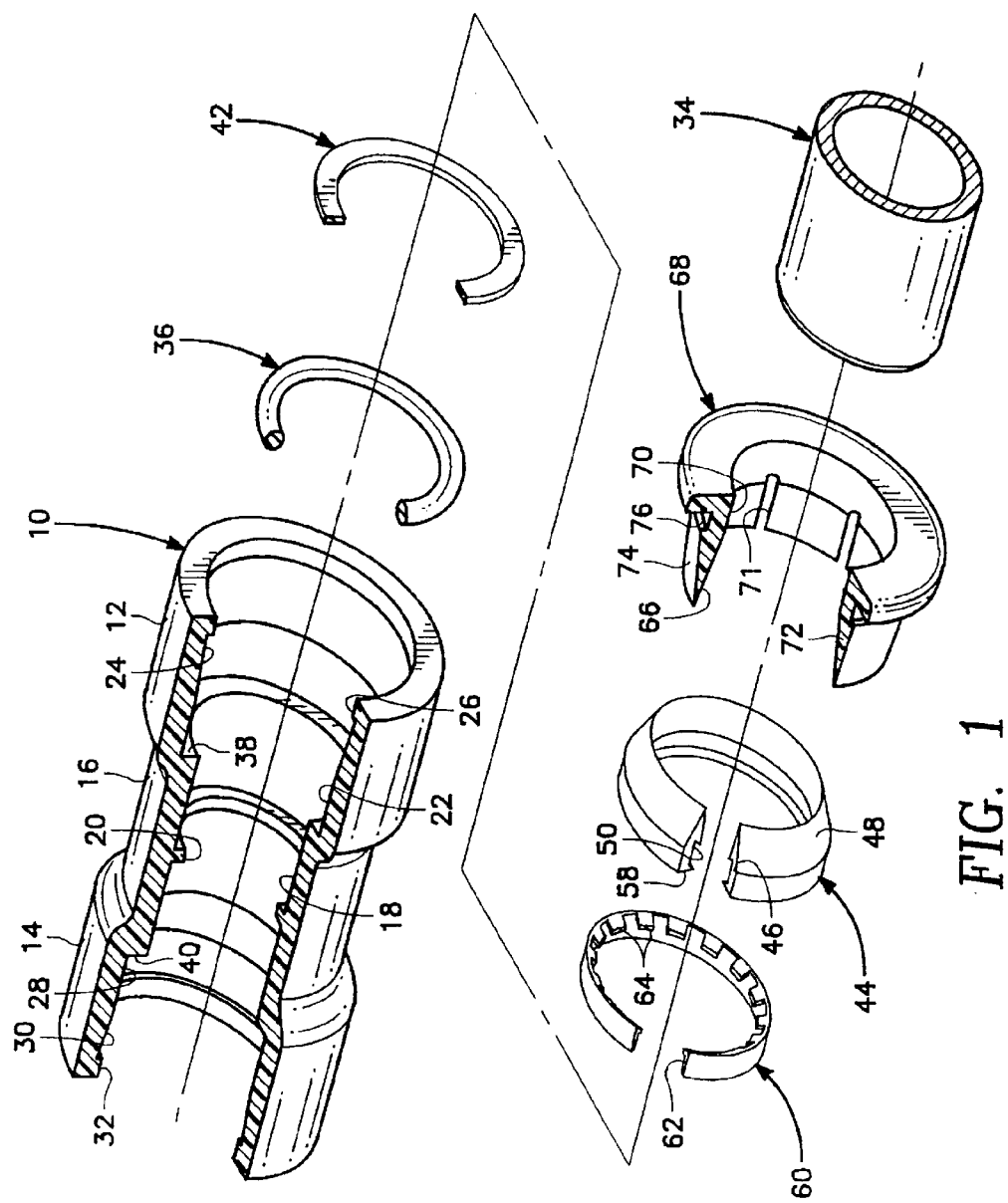
FIG. 1 is an exploded cut-away isometric view of the first embodiment of push-pull pipe coupling of the present invention.

Referring particularly to FIGS. 1 and 7, there is shown a hollow tubular member defined as a connector 10. Connector 10 has a first spool section 12 and a second spool section 14 which are constructed similarly except that the first spool section 12 is located at one side of a middle section 16 and the second spool section 14 is attached to the opposite side of the middle section 16. The middle section 16 has an internal chamber 18. Fixedly attached to the wall of the internal chamber 18 and protruding inwardly therefrom is an annular stop flange 20. The stop flange 20 is centrally disposed relative to the length of the middle section 16. The internal chamber 18 connects with a slightly larger diameter internal chamber 22 which is located within the confines of the first spool section 12. The sidewall of the internal chamber 22 is basically cylindrical with the exception that its outer portion is relieved forming a cone-shaped section 24. The cone-shaped section 24 terminates at an inwardly extending annular locking flange 26.

The interior of the second spool section 14 is constructed in a similar manner including a slightly larger diameter internal chamber 28 which connects with a cone-shaped section 30. The cone-shaped section 30 terminates at an annular locking flange 32. Basically, the internal chambers 18, 24 and 28 cooperate together to form a single through opening. A cylindrical pipe section 34, which can be any length from a few inches to tens of feet long, is to have one end inserted through the internal chamber 22 and be mounted within the internal chamber 18 and is to abut against the stop flange 20. There will also be, but is not shown, a similar pipe section that will pass through the internal chamber 28 and be located in conjunction with the internal chamber 18 and abut against the opposite side of the stop flange 20. Both pipe sections are shown in longitudinal alignment (straight coupling), however, this invention could be used in conjunction with pipe sections which are not in longitudinal alignment, such as elbow coupling and a tee coupling. It will be the function of the connector 10 to form a gas and liquid tight connection between the pipe sections, only pipe section 34 being shown, without the use of any adhesives. It is to be noted that the cone-shaped sections 24 and 30 are longer in length than the respective cone-shaped sections 24' and 31' shown in FIG. 7. The reason for this will become apparent further on in the description.

Mounted within the internal chamber 22 is a sealing ring 36. The sealing ring 36 is totally enclosed by what is generally termed an O-ring. The sealing ring 36 will be constructed of an elastic material with generally a rubber or rubberized plastic being preferred. The sealing ring 36 is to be located against the annular flange 38 which forms a connection with the internal chamber 18. It is to be understood that there is a similar annular flange 40 forming the connection between the internal chamber 28 and the internal chamber 18. Also mounted within the internal chamber 22 and abutting against sealing ring 36 is a washer 42. Washer 42 is also totally enclosed defining a completely circular object as also is the sealing ring 36. Generally, the washer 42 will be made of a metallic material but it also could be made of a hard plastic material. The usage of the washer 42 in conjunction with the sealing ring 36 is to produce a fluid tight connection between the first spool section 12 and pipe section 34. It is to be understood that there will be a washer similar to washer 42 and a sealing ring similar to sealing ring 36 that will be mounted within internal chamber 28 which will be used to produce again a fluid tight connection with the pipe section that is conducted through internal chamber 28.

Abutting against washer 42 is a grab ring housing 44. Grab ring housing 44 is not a continuous ring but will include a slight split 46. The function of split 46 will be explained further on in the specification. Grab ring housing 44 has a forward surface 48 that is tapered. Grab ring housing 44 also has on its inside surface an annular concavity 50. Annular concavity 50 terminates at a forward end, which is nearest the forward surface 48, into a front wall 52 and a rear wall 54 at the opposite end of concavity 50. Front wall 52 defines an inclined surface that is inclined at angle C from a radius line 56 of pipe section 34. Generally, the amount of inclination of front wall 52 will be in the range of about thirty-five degrees. However, the amount of this inclination can be readily varied to be substantially less than thirty-five degrees or even greater. The material of construction for grab ring housing 44 will generally be a hard plastic material, such as a polyacetal polyurethane, polystyrene or other type of plastic. Also, it is to be noted that the construction of grab ring housing 44 is the same for both FIGS. 1 and 7.

It is to be noted that rear wall 54 is also inclined about the same inclination as front wall 52. However, this inclination is of little significance and there may not be any inclination in the construction of connector 10 of this invention. Grab ring housing 44 has a bottom 58 which in relation to the first embodiment of this invention in FIGS. 1–5, bottom 58 can be positioned directly against washer 42 while in relation to the second embodiment of this invention shown in FIGS. 7 and 8, bottom 58 can be positioned directly against annular flange 38. Grab ring housing 44 is able to occupy two different positions, a rearward position, which is shown in FIGS. 2 and 3 of the drawings and a forward position, which is shown in FIGS. 4 and 5 of the drawings. These positions will be explained further on in the specification.

Mounted within concavity 50 is a grab ring 60. Grab ring 60 also includes a split 62. Grab ring 60 will normally be constructed of a metallic material with generally aluminum or steel being preferred. Grab ring 60 has a main body which is basically cylindrical in configuration and has mounted at one edge thereof a series of biting members 64. Biting members 64 extend inwardly relative to grab ring 60. Each biting member 64 includes a short longitudinal length of a member which is integrally connected to the main body of grab ring 60. The number of biting members 64 can readily vary from less than ten in number to significantly greater than ten in number. Biting members 64 are mounted at an angle "A" relative to the main body of grab ring 60. This angle "A" is when biting members 64 are at an at-rest position and are not stressed. The inclination of biting members 64 is in a direction toward annular flange 38.

In the first embodiment of this invention shown in FIGS. 1–5, forward surface 48 is to be able to abut against bevel surface 66 of a retaining cap 68. Bevel surface 66 connects with a cylindrical inner surface 70 of retaining cap 68. Bevel surface 66 forms the inside surface of a spool section 72 of retaining cap 68. Spool section 72 has an exterior surface 74. Exterior surface 74 is to abut against cone-shaped section 24. Spool section 72 includes an annular groove 76 which is formed in the exterior wall surface of spool section 72. Inner surface 70 has a series of slots 71.

Initially, sealing ring 36, washer 42, grab ring housing 44, grab ring 60 and spool section 72 are all inserted within internal chamber 22. Retaining cap 68, which will normally be constructed of a plastic material, is pressed into causing exterior surface 74 to function as a cam to ride over annular locking flange 26 until locking flange 26 falls within annular groove 76. Deflection of spool section 72 is permitted due to the slots 71. The result is all the structural components forming the coupler which comprises sealing ring 36, washer 42 grab ring housing 44, grab ring 60 and retaining cap 68 are now installed in position. Connector 10 is now ready to receive pipe section 34. Pipe section 34 is then inserted by inner surface 70 through internal chamber 22 connecting with internal chamber 18 and abutting against stop flange 20. This installation procedure of pipe section 34 is in the direction of arrow 78. It is to be noted that biting members 64 will actually deflect slightly inwardly during the movement of pipe section 34 in conjunction with connector 10. This deflection of the biting members 64 will be in a clockwise direction, as shown in FIG. 3.

The user then grabs pipe section 34 and moves such in a withdrawing direction, as represented by arrow 80 in FIG. 5. The forward tip of biting members 64 will be caught by the surface of pipe section 34 and will move with pipe section 34 a slight distance. The result is that biting members 64 will move from angle "A" in FIG. 3 to angle "B" in FIG. 5 with angle "B" being ten to fifteen degrees less than angle "A". Angle "B" will be equal to angle "C" as the pivoting of biting members 64 will continue until biting members 64 abut flush against front wall 52 of grab ring housing 44. This defines the outer limit of the movement of pipe section 34 with no further movement of pipe section 34 now being possible. The free tips of biting members 64 will dig into the wall surface of pipe section 34 with the result that a secure interconnection is now established between connector 10 and pipe section 34.

The distance of movement of the withdrawing movement of pipe section 34, as represented in FIGS. 3 and 5, can vary from a quarter of an inch to an inch or more. It can thus be seen that the bottom 58 of grab ring housing 44 is now spaced one-quarter to three-eighths of an inch from washer 42 in FIG. 5 where grab ring housing 44 abuts washer 42 in FIG. 3. During this movement of grab ring housing 44, forward surface 48 slides along bevel surface 66. Grab ring housing 44 will move to a slightly smaller diameter which is permitted because of split 46 and also split 62 of grab ring 60 as it will occupy a slightly smaller diameter. It is to be noted that each of the biting members 64 pivotally move relative to the main body of grab ring 60 with this pivoting occurring at a fulcrum which is located at the connection of biting members 64 to the main body of grab ring 60.

The second embodiment shown in FIGS. 7 and 8 is basically similar to the first embodiment of FIGS. 1–5 with connector 10 being essentially identical except for cone-shaped sections 24' and 30', grab ring 60 is identical and grab ring housing 44 is also identical. However, grab ring housing 44 is used against annular flange 38, as previously discussed. A different configuration of washer 82 is used so that an interior beveled surface 84 of washer 82 will be in abutting contact with forward surface 48 of grab ring housing 44. Sealing ring 86 is then placed against washer 82 with this sealing ring 86 being tightly squeezed by the insertion of a retaining cap 88 within internal chamber 22. Retaining cap 88 is similar to previously described retaining cap 68 except the exterior surface 90, though similarly cone-shaped, is shorter in length than retaining cap 68. Retaining cap 88 has an inner surface 92 and an exteriorly located annular groove 94. Retaining cap 88 is installed in the same manner as retaining cap 68.

During movement of pipe section 34 in the withdrawing direction, as indicated by arrow 96, grab ring housing 44 will be moved a short distance from annular flange 38 with forward surface 48 sliding on beveled surface 84 of washer 82. The gas tight and liquid tight seal obtained by sealing ring 86 is now located forward of grab ring housing 44 where within the first embodiment of this invention it was located aft of grab ring housing 44. It is believed that both the first and second embodiments of this invention will both operate satisfactorily, it just being that the second embodiment has a slightly different arrangement of parts. During movement in the direction of arrow 96, it is to be understood that grab ring housing 44 and grab ring 60 will assume a slightly smaller diameter with the free outer ends of biting members 64 biting into the exterior surface of pipe section 34.

What is claimed is:

1. A push-pull pipe coupling adapted for interconnecting a pair of pipe sections, said pipe coupling comprising:

a hollow connector having an internal chamber within which is adapted to be located a pipe section, surrounding the pipe section is a coupler, said coupler including a grab ring housing which is annular in configuration and is located about the pipe section, said grab ring housing having an interior surface that is formed into an annular concavity;

said coupler including a grab ring mounted within said concavity, said grab ring having a cylindrical main body which has a plurality of inwardly extending biting members, said cylindrical main body being mounted within said annular concavity, said biting members adapted to abut against the pipe section;

whereby said biting members are acute angularly disposed relative to the pipe section and upon movement in a withdrawing direction of the pipe section from said internal chamber said biting members are cause to pivot to a smaller acute angle and dig into the pipe section forming a securement between the connector and the pipe section; and said annular concavity having a forward wall which is located at an acute angle that is less than the acute angle of said biting members prior to the withdrawing movement of the pipe section.

2. A push-pull pipe coupling adapted to interconnecting a pair of pipe sections, said pipe coupling comprising:

a hollow connector having an internal chamber within which is adapted to be located a pipe section, surrounding the pipe section is a coupler, said coupler including a grab ring housing which is annular in configuration and is located about the pipe section, said grab ring housing having an interior surface that is formed into an annular concavity;

said coupler including a grab ring mounted within said concavity, said grab ring having a cylindrical main body which has a plurality of inwardly extending biting members, said cylindrical main body being mounted within said annular concavity, said biting members adapted to abut against the pipe section;

whereby said biting members are acute angularly disposed relative to the pipe section and upon movement in a withdrawing direction of the pipe section from said internal chamber said biting members are cause to pivot to a smaller acute angle and dig into the pipe section forming a securement between the connector and the pipe section; and said grab ring housing having a forward surface, said forward surface being annular and beveled and spaced from said grab ring.

3. The push-pull pipe coupling as defined an claim 2 wherein said forward surface connecting with an annular beveled surface formed on a retainging cap which functions to close said internal chamber.

4. A push-pull pipe coupling adapted for interconnecting a pair of pipe sections, said pipe coupling comprising:

a hollow connector having an internal chamber within which is adapted to be located a pipe section, surrounding the pipe section is a coupler, said coupler including a grab ring housing which is annular in configuration and is located about the pipe section, said grab ring housing having an interior surface that is formed into an annular concavity:

said coupler including a grab ring mounted within said concavity, said grab ring having an annular wall which has a plurality of inwardly extending biting members, said biting members adapted to abut against the pipe section;

whereby said biting members are acute angularly disposed relative to the pipe section and upon movement in a withdrawing direction of the pipe section from said internal chamber said biting members are cause to pivot to a smaller acute angle and dig into the pipe section forming a securement between the connector and the pipe section;

said grab ring housing having a forward surface, said forward surface being annular and beveled, said forward surface connecting with an annular beveled surface formed on a retaining cap which functions to close said internal chamber; and said retaining cap has a plurality of slots, said slots permit said retaining cap to deflect during installation on said hollow connector.

5. A push-pull pipe coupling adapted for interconnecting a pair of pipe sections, said pipe coupling comprising:

a hollow connector having an internal chamber within which is adapted to be located a pipe section, surrounding the pipe section is a coupler, said coupler including a grab ring housing which is annular in configuration and is located about the pipe section, said grab ring housing having an interior surface that is formed into an annular concavity;

said coupler including a grab ring mounted within said concavity, said grab ring having an annular wall which has a plurality of inwardly extending biting members, said biting members adapted to abut against the pipe section;

whereby said biting members are acute angularly disposed relative to the pine section and upon movement in a withdrawing direction of the pipe section from said internal chamber said biting members are cause to pivot to a smaller acute angle and dig into the pipe section forming a securement between the connector and the pipe section;

said grab ring housing having a forward surface, said forward surface being annular and beveled; and said forward surface interconnecting with an annular beveled surface formed on a washer which is mounted within said internal chamber.

* * * * *